April 13, 1937.  H. CREAGER  2,077,222
CABLE CLAMP
Filed June 25, 1936
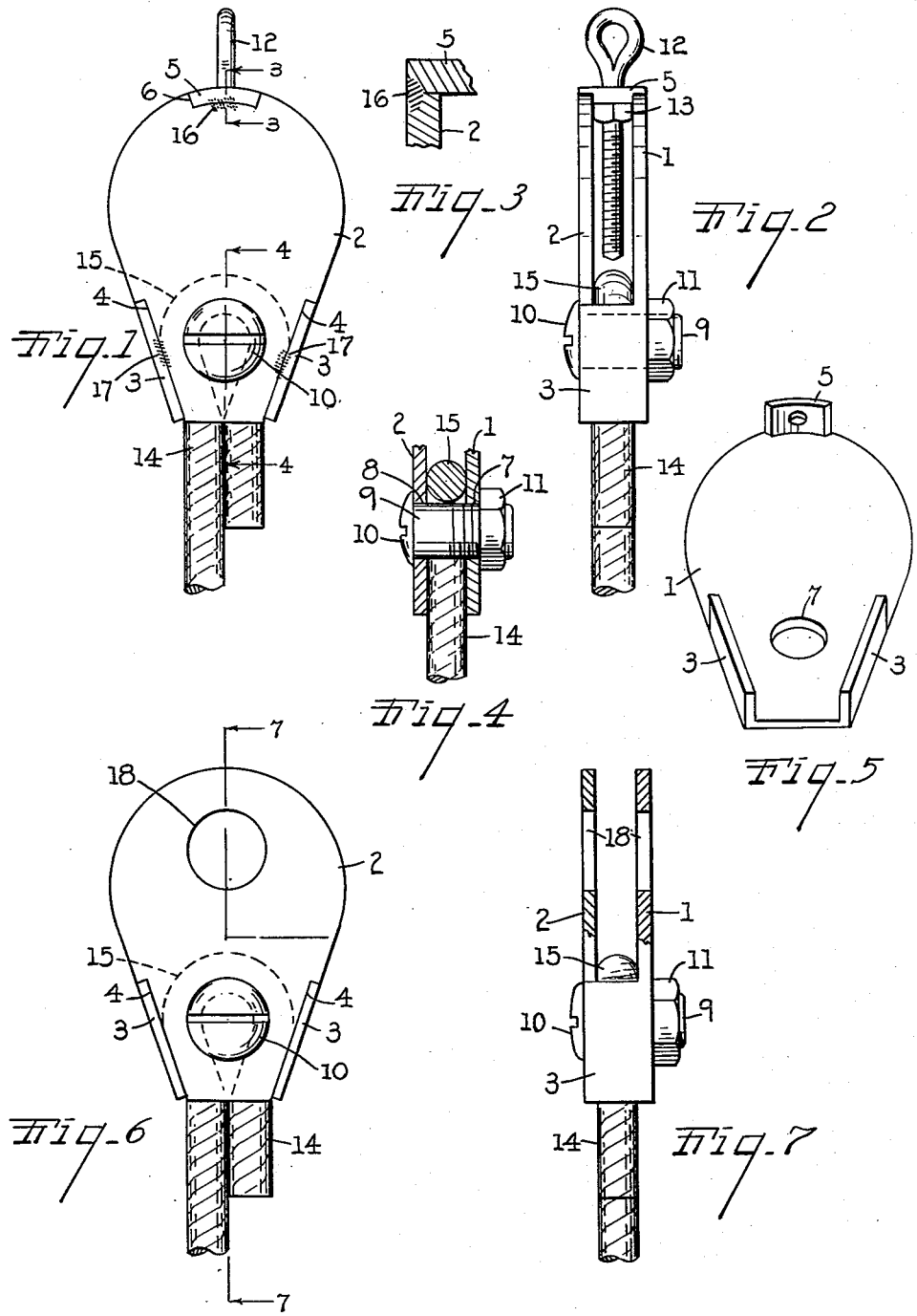
INVENTOR.
Henry Creager
BY
Chappell, Earl T. Chappell
ATTORNEYS Patented Apr. 13, 1937

2,077,222

UNITED STATES PATENT OFFICE 2,077,222

CABLE CLAMP

Henry Creager, Hartford City, Ind., assignor to Overhead Door Corporation, Hartford City, Ind.

Application June 25, 1936, Serial No. 87,199

7 Claims. (Cl. 24—115)

The main object of this invention is to provide a cable clamp or coupling adapted for use in anchoring cables in various relations which is simple and economical in structure and very effctive for the purpose and very convenient to apply to the cable.

Objects relating to details and economies of the invention will appear from the description to follow. The invention is defined and pointed out in the claims.

A structure which is a preferred embodiment of the invention is illustrated in the accompanying drawing, in which:

Fig. 1 is a plan view of my improved cable clamp, a cable partially broken away being shown in operative relation thereto.

Fig. 2 is an edge view of the structure shown in Fig. 1.

Fig. 3 is an enlarged detail section on line 3—3 of Fig. 1, showing a welded joint in a clamp and cable assembly.

Fig. 4 is a fragmentary view partially in section on line 4—4 of Fig. 1.

Fig. 5 is a perspective view of the bottom plate of the embodiment shown in Figs. 1 to 4.

Fig. 6 is a plan view of a modified embodiment of my invention with a cable in assembled relation thereto.

Fig. 7 is a fragmentary view partially in section on line 7—7 of Fig. 6.

The embodiment of my invention illustrated in Figs. 1 to 5 inclusive comprises a bottom plate 1 and a coacting top plate 2. These plates are in general of pear-shape and have inwardly converging side edges, the side edges of the bottom plate having inwardly converging flanges 3 formed integrally therewith. The side edges of the top plate have recesses 4 shaped to correspond to and receiving these flanges—that is, the top plate fits between the flanges.

The bottom plate in this embodiment is provided with a segmental lug 5 at its outer end while the top plate has a segmental recess 6 receiving this lug.

The top and bottom plates have registering or alined holes 7 and 8 respectively receiving the bolt 9 which is provided with a slotted head 10 and with a nut 11.

The lug 5 receives an eye-bolt 12 provided with a nut 13 on the inner side of the lug, this providing a swivel connection for the eye-bolt to the clamp proper and also means in the form of an adjustable turnbuckle for connecting the clamp to some part to which the cable is to be attached.

The cable indicated at 14 is formed into a loop 15, this loop being engaged or snubbed around the bolt, and the loop being wedged between the bolt and the flanges 3 so that stress on the cable brings about a wedging action which is highly efficient in preventing slipping of the cable.

The top plate may be welded to the flanges and lug as indicated at 16 and 17. This welding, it will be observed, ties the flanges and lug to the top plate and very materially strengthens the structure. However, the clamp is capable of withstanding heavy loads without the welding.

While the clamp is of general use, it is especially well adapted for anchoring cables for upwardly acting doors and the like where not only effective anchoring is required but compactness and security without excessive mass or weight. Where it is not desired to weld to flanges which is unnecessary for ordinary use, the clamp may be assembled on the cable without the aid of tools other than a wrench. The clamp is strong and secure even when made of quite light material which adapts it for use in very limited space—for example as betwen the jamb and the track at the edge of an upwardly acting door such as garage doors and the like.

In the embodiment of my invention shown in Fig. 6, the plates 1 and 2 are provided with alined holes 18 through which a cable or tie bolt may be passed. This structure does not have the swiveling or adjusting feature of the embodiment shown in Figs. 1 to 5 but has a wide range of uses and may be bolted, for example, directly to a door or engaged with a hook or other supporting or connecting part.

I have illustrated and described my improvements in an embodiment which I regard as highly satisfactory. I have not attempted to illustrate or describe various embodiments or adaptations thereof as it is believed that this disclosure will enable those skilled in the art to embody or adapt my improvements as may be desired.

Having thus described my invention, what I claim as new and desire to secure by Letters Patent, is:

1. A cable clamp comprising bottom and top plates having inwardly converging side edges, the bottom plate having inwardly converging flanges on its side edges and an upstanding lug at its outer end, the top plate having recesses in its edges corresponding to said flanges and lug and receiving the same, said plates having registering holes between said flanges, a clamping and snubbing bolt engaging said holes and around which a cable may be disposed in wedging relation to said flanges, an eye-bolt arranged through said lug, and a nut on said eye-bolt within the said lug providing a swiveling and adjusting means.

2. A cable clamp comprising bottom and top plates having inwardly converging side edges, the bottom plate having inwardly converging flanges on its side edges and an upstanding lug at its outer end, the top plate having recesses in its edges corresponding to said flanges and lug and receiving the same, said plates having registering holes between said flanges, and a clamping and snubbing bolt engaging said holes and around which a cable may be disposed in wedging relation to said flanges.

3. A cable clamp comprising bottom and top plates having inwardly converging side edges, the bottom plate having elongated inwardly converging flanges on its side edges, the top plate having recesses in its edges corresponding in shape to said flanges and receiving the same, said plates having registering holes between said flanges, and a clamping and snubbing bolt engaging said holes and around which a cable may be disposed in wedging relation to said flanges, said flanges having substantial lengthwise wedging contact with the cable.

4. A cable clamp comprising a pair of tapered plates, one of said plates being provided with elongated inwardly converging flanges and the other with recesses in its edges of a shape to correspond to and receive said flanges, said plates being provided with bolt holes between said flanges, and a combined clamping and cable snubbing bolt engaging said holes, said flanges having substantial lengthwise wedging contact with a cable arranged around said bolt and clamped by said plates.

5. A cable clamp comprising a pair of opposed plates, one of said plates having elongated converging flanges, the other being provided with edge recesses of a shape to correspond to and receive said flanges and being disposed between said flanges, and a clamping and cable snubbing bolt connecting said plates and disposed between said flanges, said flanges having substantial lengthwise wedging contact with a cable arranged around said bolt and clamped by said plates.

6. A cable clamp comprising bottom and top plates provided with bolt holes, a combined clamping and cable snubbing bolt engaging said holes, means for wedgingly clamping a cable arranged around said bolt, a swiveling turnbuckle, and means between said plates for receiving said turnbuckle.

7. A cable clamp comprising bottom and top plates, a combined clamping and cable snubbing bolt between said plates, means between said plates for wedgingly clamping a cable arranged around said bolt, a swiveling turnbuckle, and means for receiving said turnbuckle, said last named means comprising a lug on one of said plates apertured to receive said turnbuckle.

HENRY CREAGER.